(12) United States Patent
Walker et al.

(10) Patent No.: US 6,785,401 B2
(45) Date of Patent: Aug. 31, 2004

(54) TEMPORAL SYNCHRONIZATION OF VIDEO WATERMARK DECODING

(75) Inventors: Brian R. Walker, Beaverton, OR (US); Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 556 days.

(21) Appl. No.: 09/829,560

(22) Filed: Apr. 9, 2001

(65) Prior Publication Data

US 2002/0164046 A1 Nov. 7, 2002

(51) Int. Cl.$^7$ .......................... G06K 9/00; H04N 9/475; H04N 5/06; H04N 9/45; H04N 5/067; H04N 5/08

(52) U.S. Cl. ...................... 382/100; 348/515; 348/521; 348/533

(58) Field of Search .................. 382/100; 348/515, 348/500, 533, 516, 521

(56) References Cited

U.S. PATENT DOCUMENTS

| | | | | |
|---|---|---|---|---|
| 4,313,197 A | * | 1/1982 | Maxemchuk | 370/210 |
| 4,920,503 A | * | 4/1990 | Cook | 348/552 |
| 4,969,041 A | | 11/1990 | O'Grady et al. | |
| 5,091,966 A | * | 2/1992 | Bloomberg et al. | 382/203 |
| 5,285,470 A | * | 2/1994 | Schreiber | 348/384.1 |
| 5,963,909 A | * | 10/1999 | Warren et al. | 705/1 |
| 6,211,919 B1 | | 4/2001 | Zink et al. | |
| 6,215,813 B1 | * | 4/2001 | Jones et al. | 375/146 |
| 6,661,905 B1 | * | 12/2003 | Chupp et al. | 382/100 |

FOREIGN PATENT DOCUMENTS

EP     1 098 522 A1 * 5/2001 ............ H04N/7/24

OTHER PUBLICATIONS

He, et al., "A Software–Based MPED–4 Video Encoder Using Parallel Processing," IEEE, col., 8, No. 6, Nov. 1998, pp. 909–920.*
Z.H. Wei, P. Qin and Y.Q. Fu, "Perceptual Digital Watermark of Images Using Wavelet Transform", IEEE Transactions on Consumer Electronics, vol. 44, No. 4, Nov. 1998.
A. Piva, M. Barni, F. Bartolini, V. Cappellini, "DCT–based Watermark Recovering without Resorting to the Uncorrupted Original Image", ICIP, vol. 1, pp. 520–523, 1997.
M. Antonini, M. Barlaud, P. Mathieu and I. Daubechies, "Image Coding Using Wavelet Transform", IEEE Trans on Image Proc., vol. 1, pp. 205–220, 1992.

* cited by examiner

Primary Examiner—Daniel Mariam
Assistant Examiner—Shefali Patel
(74) Attorney, Agent, or Firm—Francis I. Gray

(57) ABSTRACT

A method of synchronizing a watermark decoder with a watermark encoder uses a spatio-temporal (3D) synchronization pattern added to a data pattern to produce a watermark pattern for embedment into a signal. The spatio-temporal synchronization pattern is formed by multiplying a spatial (2D) synchronization pattern with a pseudo-noise sequence for a block of signal frames having a duration of N frames. Quadrature carrier modulation may be used to increase detectability of the watermark pattern at the watermark decoder. The watermarked signal is correlated with the spatial synchronization pattern to recover a temporal synchronization signal that is used to determine a temporal offset between the watermark encoder and watermark decoder. The temporal offset is then used to synchronize the watermark decoder with the watermark encoder. Once synchronized various applications may be implemented using the spatial synchronization pattern, and error correction may be applied to the data pattern as well as the addition of a low data rate channel using Walsh codes.

46 Claims, 7 Drawing Sheets

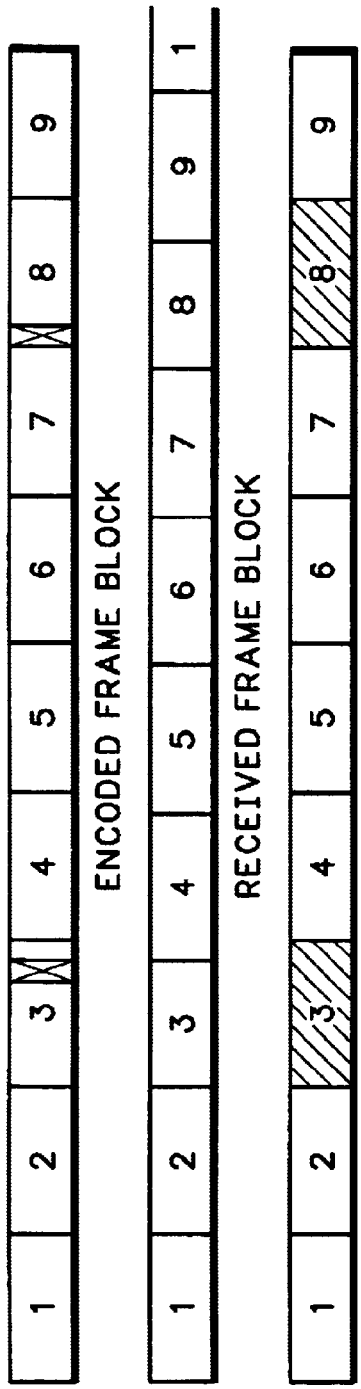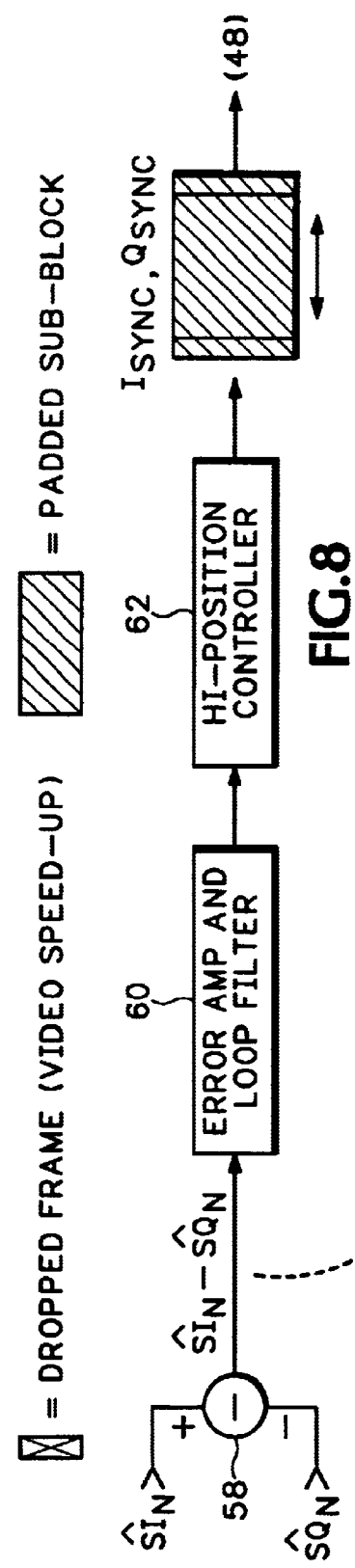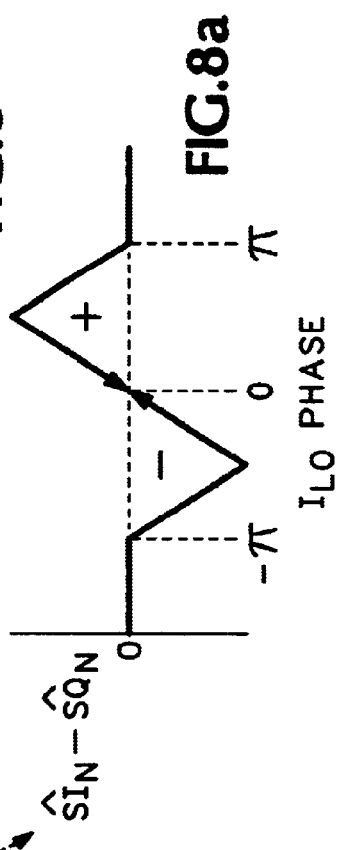

TEMPORAL SYNCHRONIZATION OF VIDEO WATERMARK DECODING

BACKGROUND OF THE INVENTION

The present invention relates to digital watermarking of video signals, and more particularly to temporal synchronization of video watermark decoding with video watermark encoding via an embedded synchronization pattern.

Digital watermarking of video signals by embedding invisible patterns into the active area of the video signals as images or digital data representations has been proposed as a viable solution to the need for copyright protection and authentication of the video signals, as discussed in U.S. Pat. No. 4,969,041. Similarly audio program material may be watermarked as well. Other applications have been proposed for the data payload of a watermarked video signal, as described in U.S. Pat. No. 6,211,919.

Since imperceptibility is important, various methods have been proposed for video and audio watermarking using masking characteristics of the Human Visual/Audio System. In the case of video watermarking a model of the Human Visual System is used to sample the video signal, often both spatially and temporally, in order to maximize the magnitude of the watermark pattern in the video signal while maintaining an acceptably low or imperceptible visibility. This is shown in FIG. 1 where a video signal is input to a Human Visual System mask generator and a watermark adder. The mask from the mask generator is used as a gain control signal to multiply on a pixel by pixel basis watermark noise-like patterns, which in turn are added to the video signal by the watermark adder to produce the watermarked video signal for distribution. The distributed watermarked video signal is received at a decoder and filtered, using a suitable filter such as a video rejection or other whitening filter, the filtered signal being correlated with the watermark noise-like patterns to determine the presence of one or more of the watermark noise-like patterns in the video signal and accordingly the data or image represented by the detected watermark noise-like patterns.

A second requirement for video watermarking is robust detection of the embedded watermark pattern after image distortions, such as translation of the image within the video frame, image cropping, geometric expansion/contraction/rotation, additive noise and image distortion due to MPEG or other lossy compression methods. Video compression and resynchronization may cause repeated or missing frames in the decompressed video output requiring the embedded watermark to be error corrected over a block of frames where not all of the watermark encoded frames are received. Correcting data is made easier if the decoder synchronizes to the same block of frames that the encoder encodes in order to detect and correct for data errors due to such repeated or dropped video frames. In fact periodic block synchronization may be necessary if the video sequence has been shortened by dropping frames for other reasons, such as commercial insertion.

Often a third requirement is the ability to detect that a video sequence has been previously watermarked so the encoder either stops the watermarking process or overwrites the watermark with a new watermark pattern orthogonal to the already existing watermark. In the latter situation the hierarchical watermarking allows a decoder to ignore the previous or lower hierarchical watermark and to decode the later or higher hierarchical watermark.

Some video watermarking methods, as shown in FIG. 2, process the video signal through a spatial or spatial-temporal image transform T before embedding the watermark patterns in the image, such as by altering the transform coefficients. The patterns may be full field images or may be subdivided into identical image tiles. An inverse transform is performed to provide the watermarked video signal for distribution. At the decoder the same image transform is performed on the watermarked video signal, and the resulting transformed signal is correlated with the original watermark pattern or tile to provide the data represented by the watermark pattern. These transform methods are useful for both improving the imperceptibility and the robustness to image distortion of the embedded watermark pattern, but at the expense of increased computational complexity in performing the image transform and determining image distortion.

Where the watermark data payload is spread over a block of frames, a watermark data decoder needs to be synchronized with the watermark encoder over the same block of frames. This temporal synchronization is advantageous for audio to video timing measurement or correction and for timing realtime metadata related to the video signal, among other applications. One obvious method of synchronizing the decoding over the same block of frames as those encoded is by using a data header in the encoded data stream to mark the boundaries of each block. However this data may be corrupted causing the block to be missed, and the data payload (number of information data bits encoded) is reduced.

What is desired is a method of temporally synchronizing a watermark video decoder with a corresponding watermark encoder over a block of frames in order to robustly determine when the watermark is present as well as the watermark signal level, to have a computationally simple method of tracking small image shifts, to recognize a previously watermarked sequence and add a higher priority level watermark pattern so that the decoder may detect either watermark pattern without error.

BRIEF SUMMARY OF THE INVENTION

Accordingly the present invention provides temporal synchronization of video watermark decoding with a watermark encoder via an embedded three-dimensional synchronization pattern encoded into a watermarked video signal over a block of frames without adding data overhead. At a watermark encoder a spatial (2D) synchronization vector multiplied by a pseudo-noise (PN) sequence of apparently random plus and minus ones that determines the polarity of the spatial synchronization vector in each frame over the block of frames to produce a spatio-temporal (3D) synchronization pattern. The 3D synchronization pattern is added to an information data pattern, modulated and further processed before finally being added to a video signal as a watermark pattern to produce the watermarked video signal. At a watermark decoder after preprocessing and demodulating the watermarked video signal is correlated with the data pattern and with the spatial synchronization vector. The correlated spatial synchronization vector is then input to a PN synchronizer that detects a temporal offset between the watermark decoder and the watermark encoder. The temporal offset is used to load a frame counter to produce frame block counts in temporal synchronization with the watermark encoder. The synchronization vector and data pattern may have I and Q components which are modulated by a quadrature carrier signal before being added together as the watermark pattern. Once video frame block synchronization is achieved, forward error correction over the block of video frames is possible using Reed-Solomon codes. Also to maintain synchronization when frames are dropped or added, the block of video frames may be subdivided into sub-blocks with synchronization correlation being done at the sub-block level to detect a missing frame or added frame in the sub-block and then padding the sub-block or dropping frames from the sub-block to maintain synchronization over the block of video frames. Also by modulating an addition data pattern with Walsh codes an additional robust, low data rate channel may be added. With a combination of hard-decisions at high data rates and soft-decisions at low data rates a gradual degradation of data detection rather than a "cliff-effect" degradation may be achieved. Also the temporal correlation of the spatial synchronization vectors may be used to generate a signal level indication for the watermarked data to determine a loss of signal condition. Further hierarchical watermarking is enabled by using orthogonal spatial synchronization vectors with separate sets of data vectors so that the watermark decoder effectively decodes the watermark with the higher hierarchy synchronization vector, effectively erasing the lower hierarchy watermark. Finally shifts of the active picture containing watermarks may be detected and corrected using the synchronization pattern.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 7 is a graphical illustrative view of compensation for missing frames according to the present invention.

FIG. 8 is a block diagram view of a portion of the watermark decoder for horizontal shifting according to the present invention, and FIG. 8a is a waveform view for FIG. 8.

DETAILED DESCRIPTION OF THE INVENTION

Figure 1:
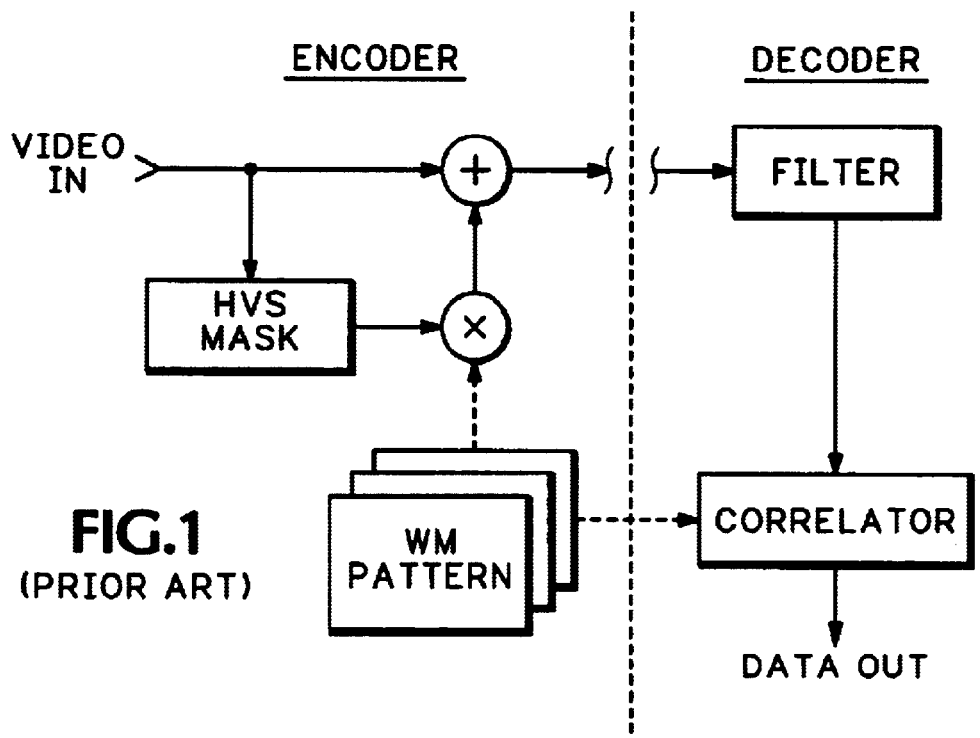
FIG. 1 is a block diagram view of a first watermarking system using a Human Vision System for masking the embedded watermark according to the prior art.
Figure 2:
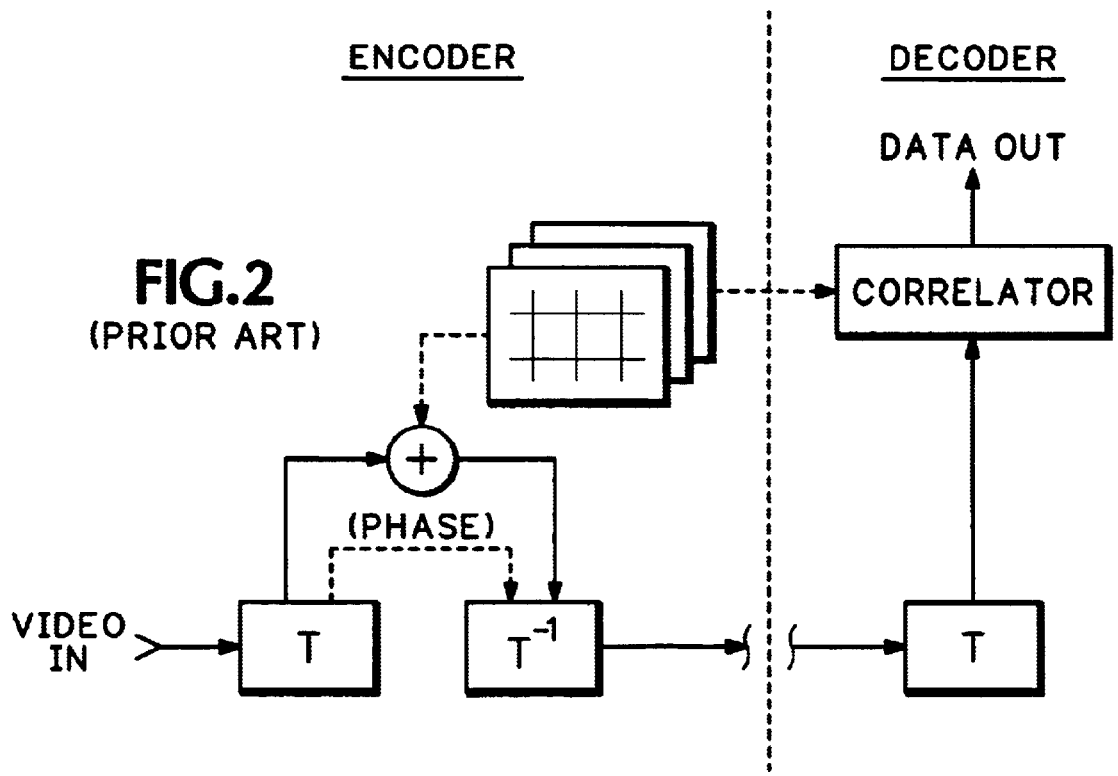
FIG. 2 is a block diagram view of a second watermarking system using image transforms according to the prior art.
Figure 3:
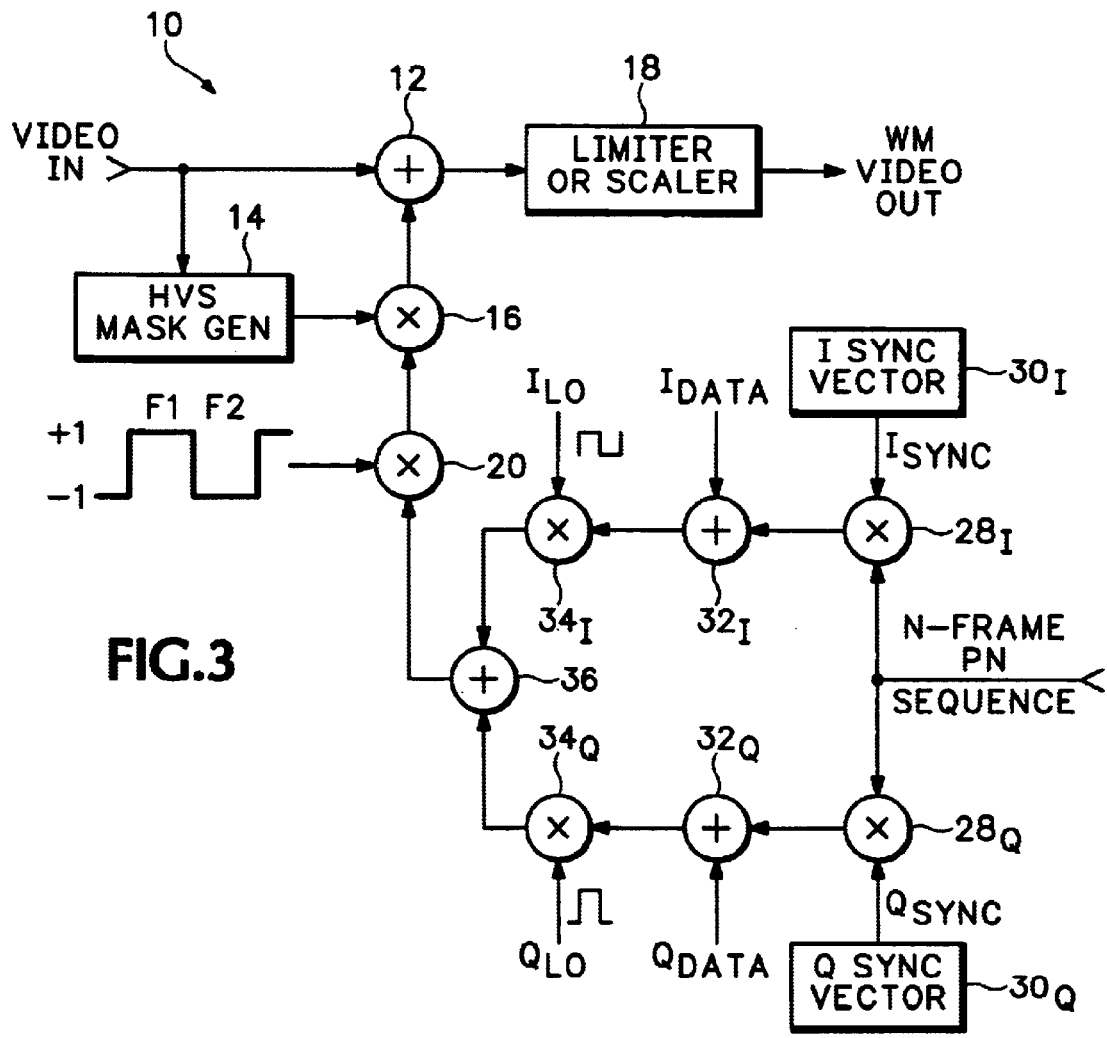
FIG. 3 is a block diagram view of an encoder for watermarking a video signal according to the present invention.

Referring now to FIG. 3 a video watermarking encoder 10 is shown having a video signal as input and providing a watermarked video signal as output. The video signal is input to a watermark adder 12 and to a mask generator 14, such as one based on a Human Vision System model. The output from the mask generator 14 is input to a mask multiplier 16 to which is input the noise-like watermark patterns. The output from the mask multiplier 16 is input to the watermark adder 12, the output of which is applied to a limiter or scaler 18 to produce the watermarked video signal. Prior to the mask multiplier 16 may be inserted another multiplier 20 which has a field signal for interlaced video as one input and the watermark pattern as the other such that the watermark pattern is repeated on both fields of a frame, but with opposite polarity to further assist in making the watermark pattern imperceptible in the watermarked video signal. For progressive video the watermark pattern is repeated on consecutive lines, but is of opposite polarity by using a line signal as the multiplier input for multiplier 20.

Figure 4:
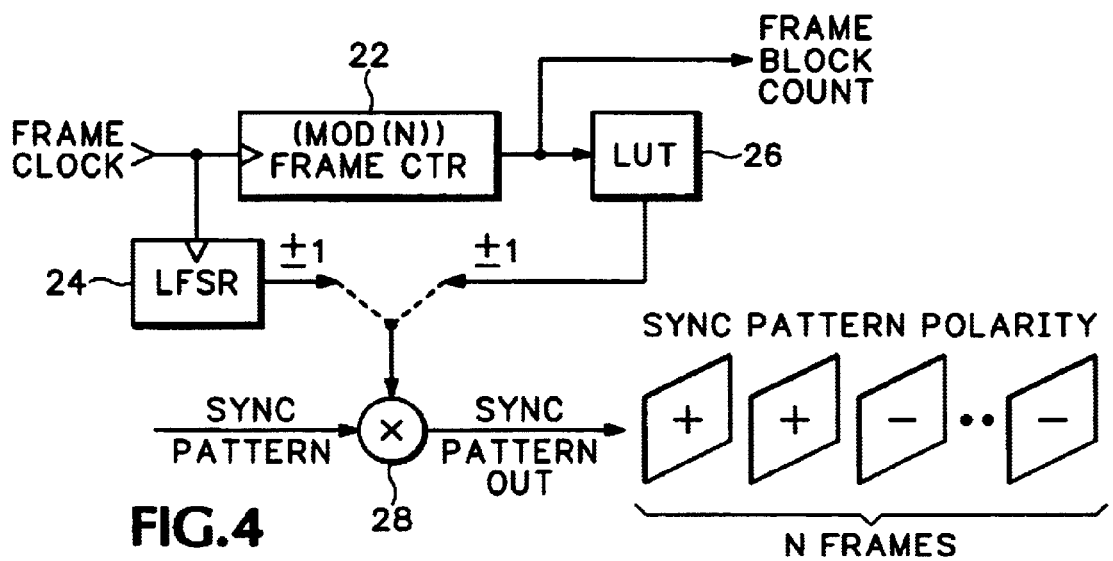
FIG. 4 is a block diagram view of a synchronization pattern generator for the encoder of FIG. 3 according to the present invention.

A block of synchronization frames is formed by generating a pseudo-random noise (PN) sequence of plus and minus ones, as shown in FIG. 4. A frame clock is input to a modulo N frame counter 22, where N is the number of frames in the block of frames and is equal to $2^m-1$, m being an integer such as 6. The PN sequence may be generated in a couple of ways, as shown. The frame clock may be input to clock a linear feedback shift register (LFSR) 24, or the output of the frame counter 22 may be used to access a look-up table (LUT) 26. The output of either one is an apparently random series of plus or minus ones that in turn are input to a sync multiplier 28 to which also is input a two-dimensional (2D) spatial synchronization pattern. (See Cooper & McGillem, "Modern Communications and Spread Spectrum", McGraw-Hill, 1986, Section 9-5 for a discussion of PN sequences and their correlation properties) The resulting output from the sync multiplier 28 is the 2D spatial synchronization pattern with the polarity being determined each frame by the PN sequence, producing a three-dimensional (3D) spatio-temporal synchronization pattern for temporal synchronization over the block of frames. The 2D spatial synchronization pattern may also be embedded as a small sub-pattern that is repeated in a tiled fashion over the 2D video frame, also with the polarity determined each frame based on the PN sequence, to produce the 3D synchronization pattern. The resulting 3D synchronization pattern may be then added to a data pattern, which may be, for example, a vector composite of six basic orthogonal data patterns to provide six data bits per frame, to produce the watermark pattern that is input to the field multiplier 20 of FIG. 3.

However when watermark patterns are embedded at baseband rather than after a spatial transform, it is desirable to up-convert the patterns' spectral energy by modulation on a carrier, as shown in the above-reference U.S. Pat. No. 6,211,919. This better masks the pattern visibility and improves detection of the watermark pattern from the video signal at the decoder. A quadrature scheme may be used for both the data pattern and the synchronization pattern, as shown in FIG. 3. This scheme, although raising the additive signal power by 3 dB, raises the detectability at the decoder by 6 dB when quadrature detection is used. The visibility increase is really less than 3 dB since the two components, I and Q, are offset by 90°, i.e., each row of the Q vector is offset by one from the corresponding row of the I vector in a horizontal circular fashion. The visibility is reduced below the 3 dB power increase due to the use of quadrature square-wave carriers, effectively doubling the visual horizontal spacing frequency. As shown there is an I sync vector source $30_I$ and a Q sync vector source $30_Q$ which provide respective I and Q sync vectors for input to the respective sync multipliers $28_I$, $28_Q$. Also input to the sync multipliers $28_I$, $28_Q$ is the PN sequence, generated as discussed with reference to FIG. 4. The respective sync vectors are then added to corresponding I and Q data vectors in adders $32_I$, $32_Q$. The resultant watermark vectors are input to modulators $34_I$, $34_Q$ and up-converted by respective square wave carriers $I_{LO}$ and $Q_{LO}$ The up-converted outputs are then summed in a quadrature summer 36 to provide the watermark pattern including the 3D synchronization pattern that is input to the field multiplier 20.

Figure 5:
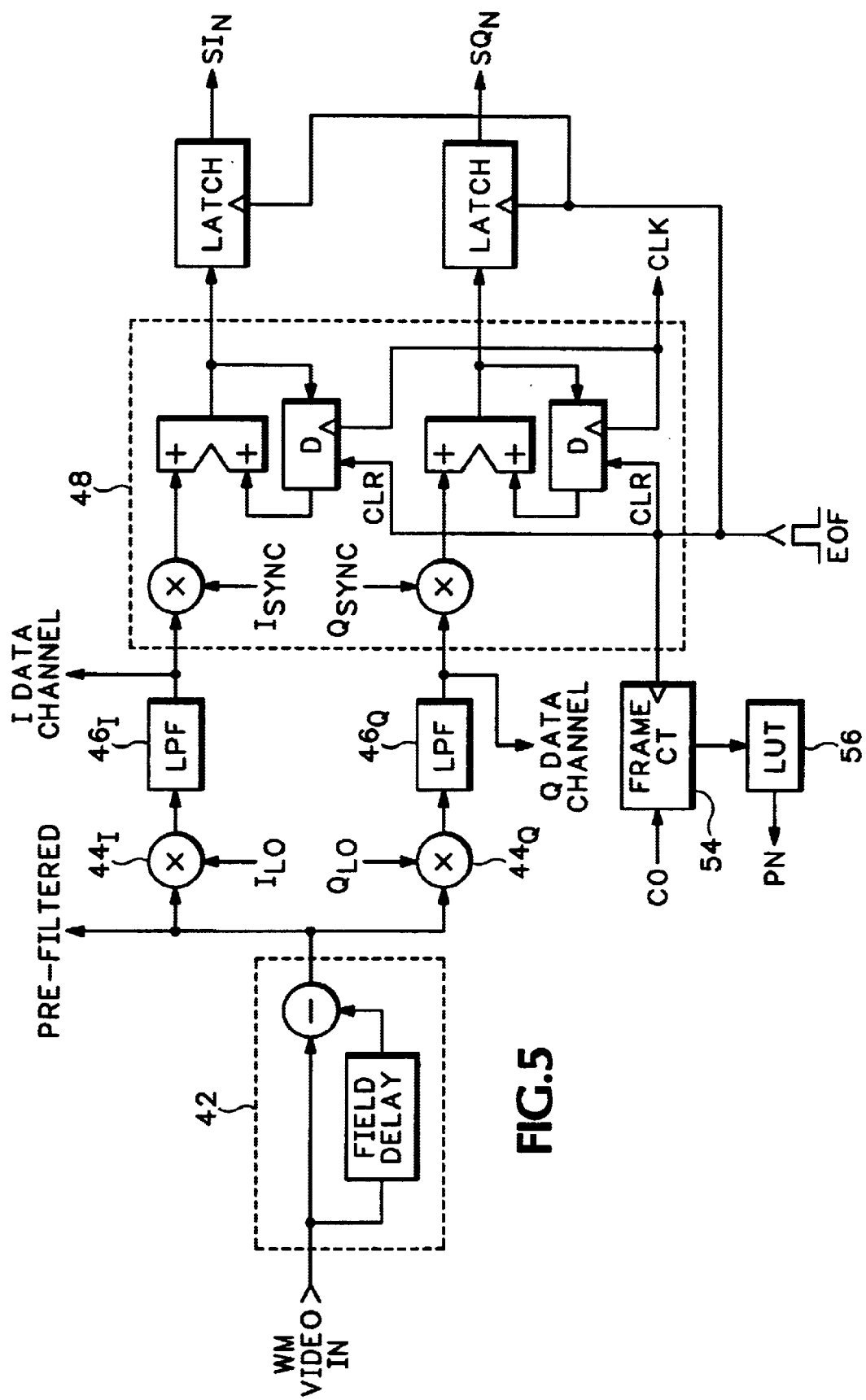
FIG. 5 is a block diagram view of a portion of a watermark decoder according to the present invention.
Figure 6:
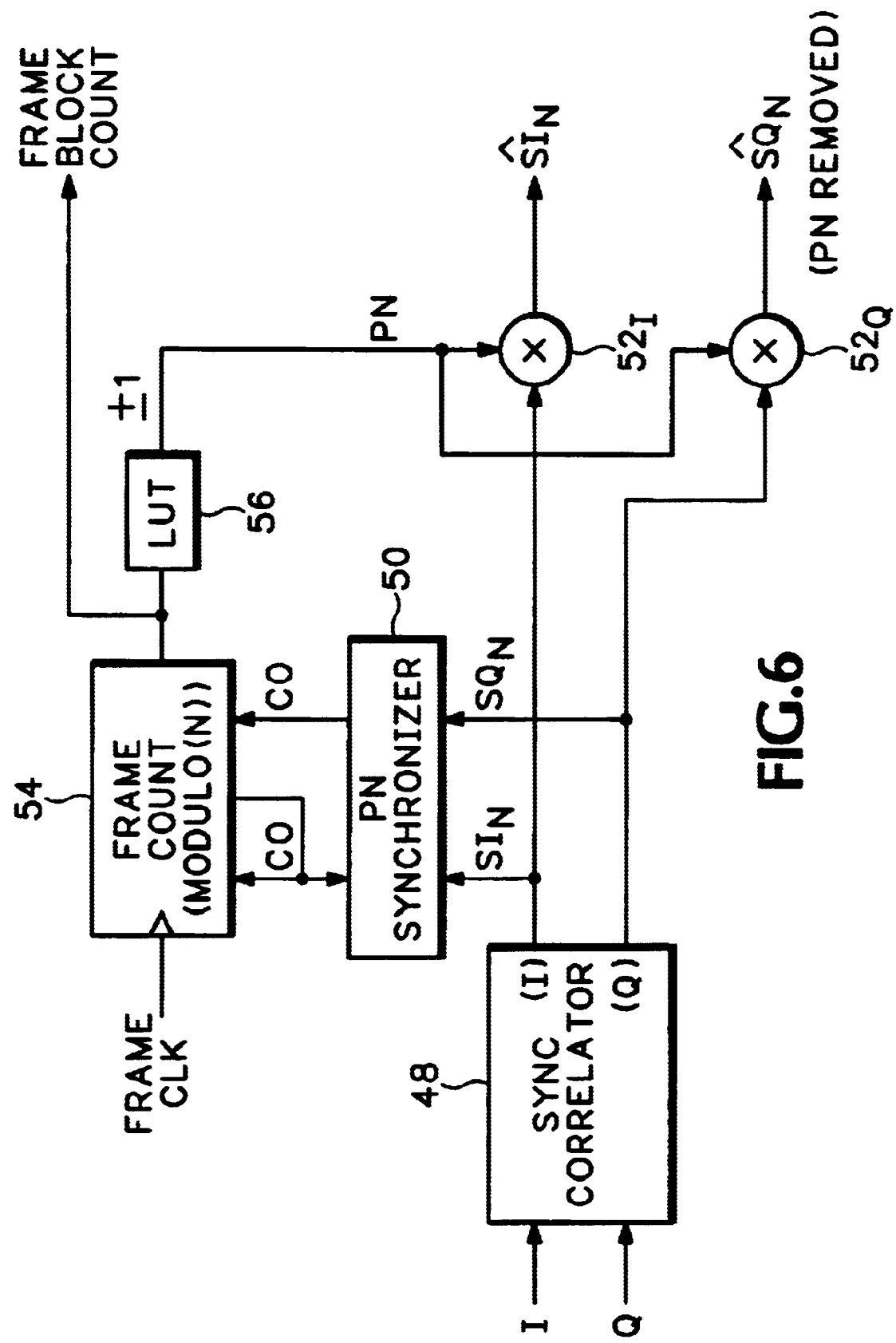
FIG. 6 is a block diagram view of a further portion of the watermark decoder according to the present invention.

The decoding process down-converts the watermarked video spectrum near the carrier before pattern detection. Additionally there may be other pre-processing in the watermark decoder, such as a comb filter or other whitening filter, on the received watermarked video signal. Referring now to FIGS. 5 and 6 a decoder is shown having the watermarked video being pre-processed, such as by a field comb filter 42 that acts as a video rejection filter where the watermark pattern polarity alternates from field to field for interlaced video or by a line comb filter where the watermark pattern polarity alternates from line to line for progressive video. The resulting filtered watermark signal is input to respective I and Q demodulators $44_I$, $44_Q$, the respective outputs of which are input to lowpass filters $46_I$, $46_Q$ and then to a sync correlator 48 for comparison with the respective I and Q vectors of the synchronization pattern as well as to data correlators (not shown) as I and Q data channels. The quadrature outputs $SI_n$, $SQ_n$ from the sync correlator 48 for each frame n are input to a PN synchronizer 50 and to respective sync multipliers $52_I$, $52_Q$. The PN synchronizer 50 performs the following functions:

$$S_n = SI_n + SQ_n$$

$$[X] = [PN]*[S]$$

where [X] is the matrix product of a circular shift PN matrix (N×N) and the synchronization matrix (1×N). An output from the PN synchronizer 50 is $C_0$, which is the index of the largest magnitude of [X].

A frame clock is applied to a decoder modulo N frame counter 54 that outputs a frame block count for the decoder. The frame block counter 54 provides an overflow output that is used as a load signal to initialize the frame block counter again and to indicate to the PN synchronizer 50 that N frames of data have been received so that the PN synchronizer may then perform the calculations indicated above. If $C_0$ is other than zero, the decoder is out of synchronization with the encoder. Therefore the load signal causes the value of $C_0$ to be loaded into the frame block counter 54 so that the frame block count at the output is in synchronization with the frame block count of the encoder.

The frame block count also is used to address a decoder look-up table 56, which in turn outputs the PN sequence corresponding to that used by the encoder. The PN sequence from the look-up table 56 is input to the sync multipliers $52_I$, $52_Q$ to produce the original quadrature synchronization vectors $I_{sync}$, $Q_{sync}$ without the PN sequence polarity modulation. A LFSR with its state controlled by the frame block counter 54 may be used in the decoder instead of the look-up table 56, just as in the encoder 10, to generate the PN sequence that is applied to the sync multipliers $52_I$, $52_Q$.

Although the decoder is described for receiving quadrature components of the synchronization pattern, where there is only a single 2D spatial synchronization pattern without I and Q components, the filtered video signal from the comb filter 42 is input to the sync correlator to generate $S_n$, which in turn is input to the PN synchronizer 50 where only the vector multiplication is performed to determine $C_0$. Also the synchronization encoder and decoder may be implemented in software rather than hardware, as the processing may readily be performed on a per frame basis when the rate is 25–60 frames per second.

To better describe the synchronization pattern encoding and decoding the following pseudo-code description is provided. The carrier modulation for spectral up-conversion and any filtering or pre-processing is omitted for clarity.

```
int N=63//# of video frames in a temporal block of frames//
int PN[0:N-1][0:N-1]={matrix of row shifted PN
    sequences}//PN sequence or M-sequence of
length N where each row is a circular shift to the right of the
    previous row//
int k=0
int i,j
int C=136, int R=240//# of rows and columns in the 2D
    sync-pattern//
int SyncPatI[0:R-1][0:C-1]//2D sync pattern embedded in
    each frame//
int SyncPatQ[0:R-1][0:C-1]//SyncPatI circularly shifted
    horizontally one column//
int SyncPatOut{0:R-1][0:C-1]//Output pattern embedded
    in each frame modulated by PN//

If Encode
k=0
repeat for i=0 to R-1//create PN modulated 2D sync-pattern//
    for j=0 to C-1
        SyncPatOut[i,j]=SyncPatQ[i,j]*PN[0,k]+SyncPatI[i,j]
            *PN[0,k]//use row 0 of PN//
    k=(k+1)% N
    until DONE int VideoIn[0:R-1][0:C1]//received watermarked video
    frame//
int SyncI[0:N-1], SyncQ[0:N-1], S[0:N-1], X[0:N-1]

if DECODE
k=0
SyncI[ ], SyncQ[ ], S[ ]=0
repeat for i=0 to R-1//do receive correlation every video frame//
    for j=0 to C-1{
        SyncI[k]=SyncI[k]+SyncPatI[i,j]*VideoIn[i,j]
        SyncQ[k]=SyncQ[k]+SyncPatQ[i,j]*VideoIn[i,j]
        S[k]=SyncI[k]+SyncQ[k]//create sum of I and Q//
    }
    k=k+1
    if (k>N-1) {
    for i=0 to N-1
    for j=0 to N-1
        X[i]=X[i]+PN[i,j]*S[i]//do matrix multiply//
    Y=0//find index of largest X[ ]//
    for i=0 to N-1
    if (Y<X[i]) {
        Y=X[i]
        C=i
        }
    k=c//synchronize decoder to encoder// until DONE
```

Once video frame block synchronization is done, Forward Error Correction (FEC) over given data blocks or a block of video frames is possible. FEC is a process of inserting redundant data into the encoded data that may be used at the receiver to correct data errors resulting from noise or other factors that corrupt digital data during transmission. The well known Reed-Solomon (RS) codes are a subset of the Bose-Chaudhuri-Hocquenghem (BCH) binary cyclic codes where the extension-field size and the block length are the same. For example, in the case where the extension field is defined as powers of a primitive element alpha (alpha z), a possible $6^{th}$ order primitive polynomial p(z) is:

$$p(Z)=1+Z+Z^6$$

Therefore, there are 63 non-zero powers of alpha and 63 symbols, or groups of bits, per block. These symbols form a Galois field GF($2^6$) and each symbol may be encoded as a 6-bit data word by embedding 6 data vectors into each video frame forming a block of 63 symbols 63 video frames long. Each data vector is checked in the correlation receiver for polarity and a hard-decision (1 or 0) is made for each bit of the 6-bit symbol. To correct T symbols, 2*T parity symbols are created with RS encoding. For example, a systematically encoded RS(63, 25) code has a block of 63 video frames with 25, 6-bit payload symbols (150 data bits) and 38, 6-bit parity symbols providing complete correction of up to 19 erred symbols (114 bits) in the 63-frame block. (See Blahut, Richard E., "Theory and Practice of Error Control Codes", Addison-Wesley, May 1984 for further details about BCH coding, Galois fields and RS coding) RS decoding is done on the 63-frame block based on the video frame block synchronization via the embedded sync patterns, which also identifies the systematically encoded payload symbols.

MPEG coding/decoding tends to cause repeated video frames or, for the watermark encoding, repeated symbol data within a GOP (Group of Pictures), since the watermark is detectable in I and P frames but may be a repeat of a prior watermark in B frames, i.e., watermark symbols occurring at a frame rate are repeated due to the MPEG compression. Therefore a 63-frame block coding works well in detecting and correcting the watermark in the frames of each GOP since typical GOP's are 19 or less frames long. The "errored" frames are detected and corrected by the FEC algorithm.

Sometimes video movies or programs are speeded up by a few percent to allow local commercial insertion time not provided by the original program play length. The audio speed-up and missing video frames are typically not noticed. After a missing video frame or watermark data pattern, the frame block synchronization is wrong for the duration of the block and all the subsequent data symbols are detected as erred even though they are correct.

This problem is solved by dividing the block of frames into sub-blocks spanning a shortened PN sequence thus making it possible to re-synchronize within the larger block to multiple missing frames within the block. For example, FIG. 7 shows an N=63, or 63-frame block divided into 9, N=7, or 7-frame sub-blocks. Each sub-block is encoded with a repeating PN sequence of length 7. Receive correlation is done with N=7 on each sub-block. If only one or two frames are missing within a sub-block, the sub-block is padded with a repeated frame to replace the missing frame(s) and the frame counter corrected by the next sub-block. This way several frames may be dropped within a 63-frame block, but the entire block is padded with a few repeated frames to allow the 63-frame block FEC to maintain block synchronization and correct the data for the missing frames and for short-term (seven frames) frame synchronization error. Similarly, this method may be used on video that has been slowed down, such as by adding repeated frames, by dropping a frame in the corresponding sub-block where the extra frame is detected by the receive correlation.

With frame block synchronization it is also possible to provide a soft-decision (scalar values instead of just a 1 or 0) error-correction or temporal correlation receiver. This may be done, for example, by modulating a single alternative data pattern's polarity each video frame with the elements of one of a set of N pair-wise orthogonal codes. For example, a 7-frame block of video frames may contain a pattern modulated by 8 rows (Walsh codes) of a Walsh-Hadamard matrix (See Cooper et al, pgs. 213–214) by shortening the codes, i.e., deleting the first row that has all 1's.

$$WW = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$

$$W = \begin{bmatrix} 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$

By removing the first row of all 1's from Walsh-Hadamard matrix [WW], matrix [W] is formed. Each column corresponds to a 7-element vector representing a 3-bit data word. An additional bit is encoded by multiplying the column by +/−1 to create a bi-orthogonal symbol set of shortened Walsh codes. (See Cooper et al, pg. 215) By appending a +1 times the average received pattern magnitudes to the first element of the 7-frame block of the received watermark pattern values, an 8-element received vector, [r], is formed. Vector [s] is then computed from the following matrix equation:

$$[s]=[WW]^{T}*[r]$$

The index of the largest element of [s] is found to decode 3-bits of data and the polarity of the largest value indicates the $4^{th}$ bit of data. This way 4-bits of data per watermark pattern may be encoded into 7 video frames and, since no hard-decisions are made, a robust bi-orthogonal coding is accomplished with high noise and missing/added frame immunity. It is also possible to simplify the receive correlation by not appending +1 times the average receive pattern magnitudes and performing the following matrix multiplication:

$$[s]=[WW]^{T}*[r]$$

The data is decoded as before but, since the columns of [W] are not mutually orthogonal in this case, some small, but possibly acceptable, loss in detection robustness occurs.

In a similar manner an even more robust bi-orthogonal code may be created by extending the Walsh-Hadamard matrix to a 63×64 matrix. This way 7-bits of data may be encoded for each data pattern over a 63-frame block. Combining this as a low data rate channel with the RS coded, hard-decision decoded data pattern set as a high data rate channel creates a method of embedding a separate soft-decision decoded (correlated), robust, 7-bit data word from a single additional data pattern into the block of frames. This combination forms effectively two data channels where the first is a hard-decision, FEC protected data channel of potentially high bit-rate but lower robustness and the second is a lower bit-rate, higher robustness data channel exploiting soft-decision correlation gain processing of a block of video frames. The lower data rate channel may still be decoded without error after video signal degradation that has rendered the high data rate channel erred beyond the FEC correction capability, thus forming a gradual degradation of data detection rather than the well-known "cliff-effect" degradation.

For the case of the Walsh-Hadamard, one of the values of [s] should be very large, approximately equal to the sum of the N 2D frame correlation values, and all the others near zero when reception is good. Similarly, for the case of the SyncI+SyncQ PN sequence correlation values, one value of [X] is the sum of all N received values and the others are small and of opposite polarity due to the circular correlation property of a PN M-sequence (See Cooper et al). Either of these properties may be used to obtain an indication of the received watermark signal level. For example, the largest value of [X] and the second largest value are used as a normalized signal level over the range of 0 to unity as follows:

$$SigLev=1-|SecondLargest(X)/Largest(X)|, 0<SigLev<1$$

or alternatively $$SigLev=(|Largest(X)|-|SecondLargest(X)|)/sum(|X_n|), 0<SigLev<1$$

where "$sum(|X_n|)$" is the sum of the absolute values of each element of [X].

The SecondLargest(X) may also be replaced with the average of all the remaining values of [X] to improve the signal-level detection accuracy somewhat. Also, the values of [s] from the Walsh-Hadamard matrix may be used as follows:

$$SigLev=1-|SecondLargest(s)/Largest(s)|, 0<SigLev<1$$

When all of the elements of [X] or [s] are nearly equal, the SigLev value approaches zero. The SigLev is indicated by an icon or bar-graph scaled such that full size represents unity and min indication or no bar-graph represents zero. Also the SigLev value may be compared to a constant near zero to determine a loss-of-signal (LOS) condition to indicate video that is not watermarked or for which the watermark is insufficient for reliable decoding.

The addition of a watermark synchronization pattern separate from the watermark data patterns provides the additional feature of hierarchical watermark signature detection. A particular synchronization pattern may be associated with a particular set of data vectors which, when summed together, form the watermark embedded in the video signal. Another, different and pair-wise orthogonal, synchronization pattern may be associated with another set of data vectors that are mutually orthogonal to the first set of data vectors. These sets form a hierarchy of embedded data such that a decoder or watermark correlation receiver may check for more than one synchronization pattern at the same time. When a synchronization pattern of higher priority is detected, the receiver switches its correlation detection from the first set of data vectors to the second set of data vectors. In this way an effective erasure of the first set of data vectors occurs since the second set has higher priority. The first set is still available for decoding, but the data may be assumed to be void and replaced by the second set.

Similarly a watermark encoder may be simultaneously correlating the video to which it is adding its watermark data with the known synchronization patterns to check if the video has previously been watermarked. If it has, the encoder may either stop encoding the watermark until the video has no previous detectable watermark or may overwrite with a higher order synchronization pattern and associated data patterns, effectively erasing the previous watermark data.

Extending this to a hierarchy of more than two sets of data vectors, each with a particular associated synchronization pattern from a set of mutually orthogonal synchronization patterns, allows a previously watermarked video to be overwritten several times with new data that is of higher priority. Additionally the higher priority watermark pattern set being encoded by the encoder may be temporally synchronized with the overwritten previously watermarked data set since the synchronization pattern also provides the temporal block of video frame detection described above.

When the video processing of the watermarked video signal shifts the active picture horizontally and/or vertically, the embedded 3D synchronization pattern may be used to detect these shifts and synchronize the watermark decoder accordingly. As shown in FIG. 8 the component synchronization patterns with the PN sequence temporal polarity modulation removed are differenced in a subtractor 58. This difference signal provides a phase detection function indicated by the waveform of FIG. 8a, where the range is +π to −π of one of the quadrature carriers, such as the in-phase local oscillator signal, $I_{LO}$. The difference signal is processed by an error amplifier and loop filter 60, as is typical in a phase-locked loop (PLL), to control a horizontal controller 62 that adjusts horizontally the position of the $I_{sync}$ and $Q_{sync}$ patterns input to the receive sync correlators 48. This forms a closed loop feedback system to track horizontal shifts of the active picture information containing the $I_{sync}$ and $Q_{sync}$ encoded synchronization patterns.

Figure 9:
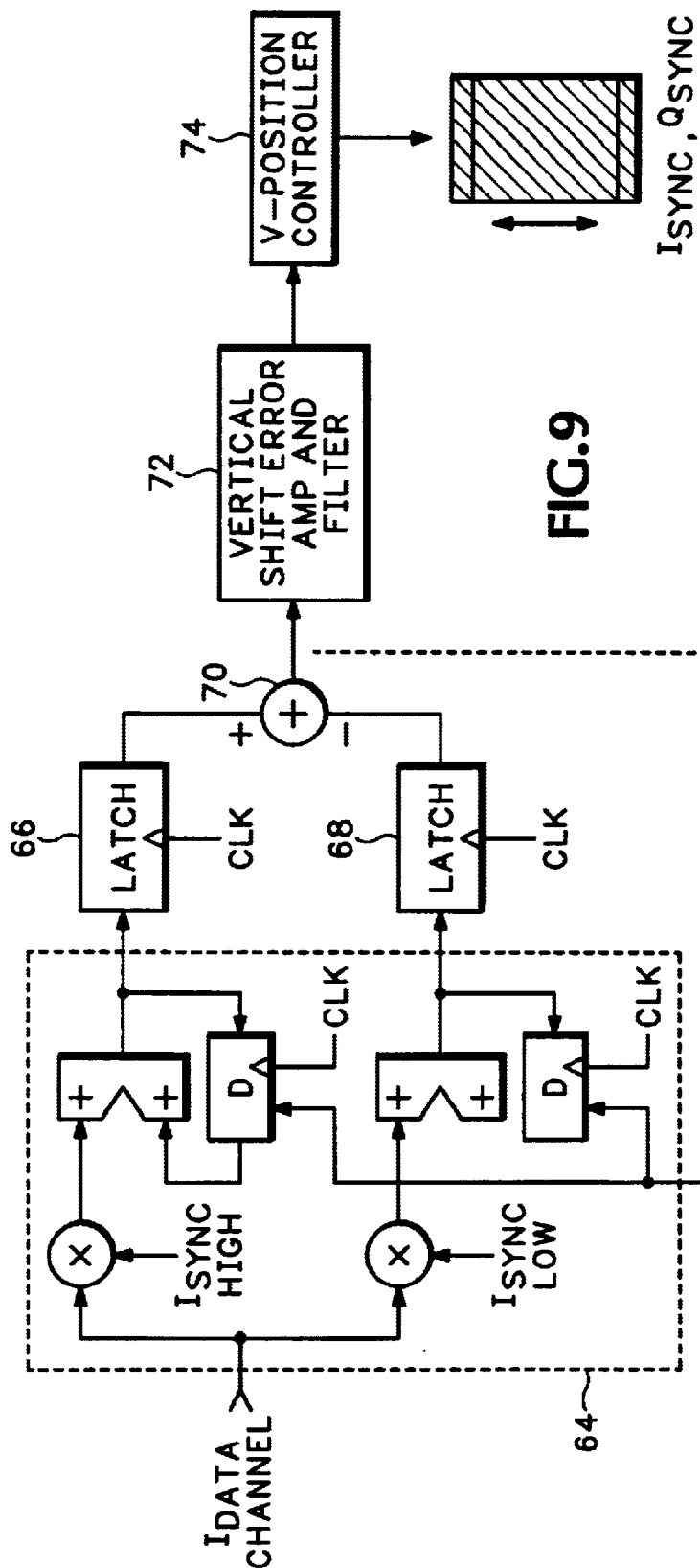
FIG. 9 is a block diagram view of a portion of the watermark decoder for vertical shifting according to the present invention.
Figure 9A:
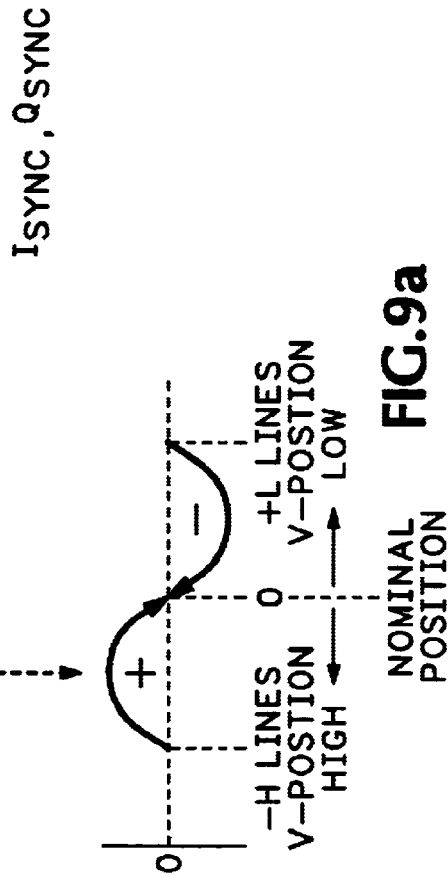
FIG. 9a is a waveform view for FIG. 9.

Another method to detect and track shifts of the watermark embedded active picture may be used when there is no local oscillator signal modulating the pattern, such as is the case with vertical shifts. In this case two additional correlators 64, as shown in FIG. 9, running over the video frame are used for correlating the received I channel data, for example, with shifted versions of the reference $I_{sync}$ pattern, $I_{sync-high}$ and $I_{sync-low}$. The correlation results are latched in respective latches 66, 68 and subtracted by summation circuit 70. $I_{sync-high}$ is formed by circular shifting vertically H video lines, such as H=10, the original 2D spatial $I_{sync}$ synchronization component. Similarly $I_{sync-low}$ is formed by circular shifting the $I_{sync}$ synchronization component downward L video lines, where L may equal H. The difference output, latched each video frame, is shown in FIG. 9a, and is input to a vertical shift error amplifier and loop filter 72 to generate a control signal for a vertical position controller 74 which in turn controls the vertical position of $I_{sync}$ as described above with reference to the horizontal offset correction. The Q data channel is vertically corrected in the same manner, i.e., $Q_{sync}$ is adjusted to track the $I_{sync}$ pattern vertical shift.

Figure 10:
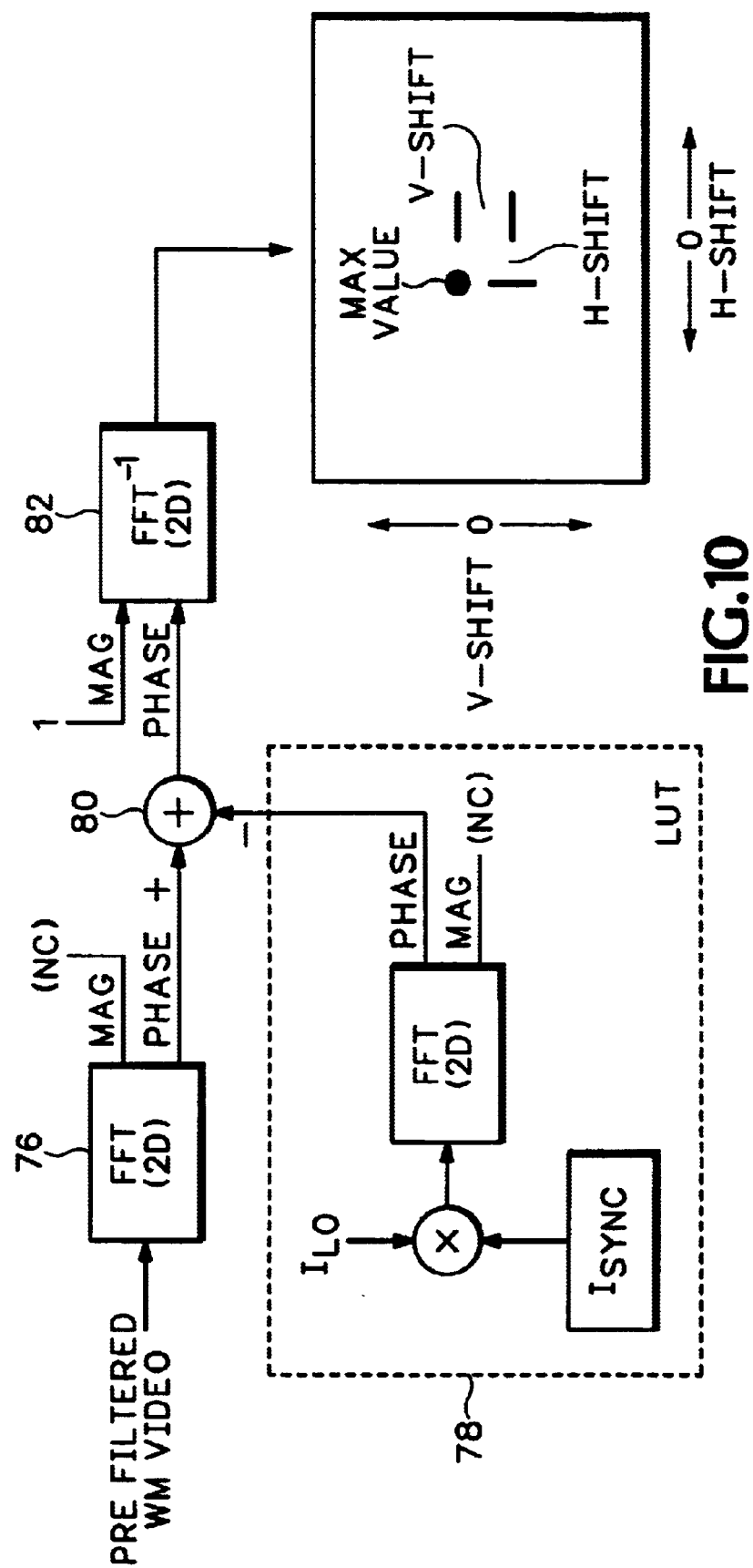
FIG. 10 is a block diagram view of a portion of the watermark decoder for position shifting according to the present invention.

Another method to detect and track shifts of the watermark embedded active picture using the embedded 3D synchronization pattern is shown in FIG. 10. Here the video frame, or a sub-frame tile to reduce computation time, is passed through a 2D-Fast Fourier Transform (FFT) 76. The magnitude result is not used and only the phase result is needed to make a phase correlator. This is accomplished by subtracting the phase of the reference sync pattern, after modulation by the local oscillator $I_{LO}$ and fast Fourier transformation, from the phase output from the FFT 76. If the encoded synchronization pattern is a sub-frame tile, then only the phase of the smaller sub-frame tile $I_{sync}$ pattern is needed. In either case the $I_{sync}$ reference pattern phase may be provided by a lookup table 78 so that an additional reference FFT is not needed. The phase difference is obtained by a subtractor 80 and input to an inverse 2D FFT 82 where the magnitude input is set to unity. The inverse transform is a 2D sinc or 2D sin(x)/x function. A maximum value is at coordinate 0,0 (the center of the active picture or tile) if there is no shift of the received video frames after the $I_{sync}$ portion of the watermark was embedded. Otherwise the coordinate of the maximum value indicates the number of pixels horizontally and vertically that the video frame was translated after the $I_{sync}$ portion of the watermark was embedded. The dispersion, or 2D half amplitude, area indicates the amount of contraction or expansion that has occurred on the received video frame. Expansion of the sinc pulse in either the vertical or horizontal dimension indicates that the video frame has been expanded in that dimension and, conversely, contraction indicates that the video frame has been shrunk or reduced in area in either dimension or both.

Thus the present invention provides a method of temporally synchronizing a watermark decoder with a watermark encoder over a block of frames using an embedded 3D synchronization pattern as part of a watermark pattern. With temporal synchronization several applications using the synchronization pattern at the decoder are provided.

What is claimed is:

1. A method of temporally synchronizing a watermark decoder with a watermark encoder comprising the steps of:

at the watermark encoder generating a pseudo-noise sequence for a block of signal frames having a duration of N frames at a frame rate of a signal to be watermarked where N is an integer;

multiplying a spatial synchronization pattern by the pseudo-noise sequence to produce a spatio-temporal synchronization pattern;

adding the spatio-temporal synchronization pattern to a data pattern to produce a watermark pattern for watermarking the signal to produce a watermarked signal; and at the watermark decoder correlating the watermarked signal with the spatial synchronization pattern to produce a temporal synchronization signal;

generating from the temporal synchronization signal an offset signal representing a temporal offset between the watermark encoder and watermark decoder; and synchronizing the watermark decoder with the watermark encoder using the offset signal.

2. The method as recited in claim 1 further comprising the steps of:

at the watermark encoder modulating the watermark pattern with a carrier frequency to produce a modulated watermark pattern as the watermark pattern; and at the watermark decoder demodulating the watermarked signal with the carrier frequency to produce a demodulated watermarked signal as the watermarked signal for correlating with the spatial synchronization pattern.

3. The method as recited in claim 2 wherein the multiplying step comprise the step of multiplying quadrature components of the spatial synchronization pattern by the pseudo-noise sequence to produce quadrature spatio-temporal synchronization patterns.

4. The method as recited in claim 3 wherein the adding step comprises the steps of:

adding the quadrature spatio-temporal synchronization patterns to corresponding quadrature components of the data pattern to produce quadrature watermark patterns; and adding the quadrature watermark patterns together to produce the watermark pattern.

5. The method as recited in claim 4 wherein the modulating step comprises the step of modulating the quadrature watermark patterns with a quadrature carrier signal to produce modulated quadrature watermark patterns for adding to produce the modulated watermark pattern as the watermark pattern.

6. The method as recited in claim 5 wherein the demodulating step comprises the step of demodulating the watermarked signal with the quadrature carrier signal to recover the quadrature watermarked signals.

7. The method as recited in claim 6 wherein the correlating step comprises the step of correlating the quadrature watermarked signals with the quadrature spatial synchronization patterns to produce quadrature temporal synchronization signals.

8. The method as recited in claim 7 wherein the watermark decoder generating step comprises the steps of:

adding the quadrature temporal synchronization signals to produce the temporal synchronization signal;

calculating a matrix product of a circularly shifted pseudo-noise (PN) sequence matrix with the temporal synchronization signal, the temporal synchronization signal being a matrix having a value for each frame of the block of signal frames; and determining as the offset signal an index to the entry in the matrix product having a maximum value.

9. The method as recited in claim 8 wherein the synchronizing step comprises the steps of:

counting a frame clock at the frame rate in a modulo N frame counter; and loading the modulo N frame counter with the offset signal when the modulo N frame counter overflows so that the modulo N frame counter provides as an output a frame count corresponding to the block of frames in synchronization with the watermark encoder.

10. The method as recited in claim 9 further comprising the steps of:

regenerating the PN sequence at the watermark decoder in synchronization with the watermark encoder;

combining the regenerated PN sequence with the quadrature temporal synchronization signals to produce quadrature spatial synchronization signals; and determining a horizontal shift of the signal from the quadrature spatial synchronization signals.

11. The method as recited in claim 10 further comprising the step of shifting the quadrature spatial synchronization patterns according to the horizontal shift prior to the correlating step.

12. The method as recited in claim 10 wherein the regenerating step comprises the step of accessing a lookup table using the frame count from the modulo N frame counter as an address, the output from the lookup table being the PN sequence in synchronization with the watermark encoder.

13. The method as recited in claim 10 wherein the determining step comprises the steps of:
differencing the quadrature spatial synchronization signals to produce a difference signal; and
generating from the difference signal a horizontal control signal indicative of the horizontal shift.

14. The method as recited in claim 13 wherein the shifting step comprises the step of horizontally shifting the quadrature spatial synchronization patterns in response to the horizontal control signal.

15. The method as recited in claim 9 further comprising the steps of:
correlating one of the quadrature watermarked signals with a pair of spatial synchronization patterns derived from the corresponding quadrature spatial synchronization pattern, one of the pair being the quadrature spatial synchronization pattern shifted upward by H lines and the other being the quadrature spatial synchronization pattern shifted downward by L lines, to produce a pair of temporal synchronization signals, H and L being integer values; and
determining from the pair of temporal synchronization signals a vertical shift of the watermarked signal.

16. The method as recited in claim 5 wherein the determining step comprises the steps of:
differencing the pair of temporal synchronization signals to produce a difference signal; and
generating from the difference signal a vertical control signal representing the vertical shift.

17. The method as recited in claim 16 further comprising the step of shifting the quadrature spatial synchronization patterns prior to the correlating step according to the vertical shift.

18. The method as recited in claim 17 wherein the shifting step comprises the step of vertically shifting the quadrature spatial synchronization patterns in response to the vertical control signal.

19. The method as recited in claim 8 further comprising the step of obtaining a watermark pattern signal level from the matrix product.

20. The method as recited in claim 19 wherein the obtaining step comprises the step determining the watermark pattern signal level as a function of a largest value of the matrix product and a second largest value of the matrix product.

21. The method as recited in claim 20 wherein the determining step comprises the step of solving the following formula for the watermark pattern signal level:

$$\text{SigLev} = 1 - |\text{SecondLargest}(X)/\text{Largest}(X)|$$

normalized over a range from zero to one where SigLev is the watermark pattern signal level, SecondLargest(X) is the second largest value of the matrix product and Largest(X) is the largest value of the matrix product.

22. The method as recited in claim 20 wherein the determining step comprises the step of solving the following formula for the watermark pattern signal level:

$$\text{SigLev} = (|\text{Largest}(X)| - |\text{SecondLargest}(X)|)/\text{sum}(|X_n|)$$

normalized over a range from zero to one where SigLev is the watermark pattern signal level, SecondLargest (X) is the second largest value of the matrix product, Largest(X) is the largest value of the matrix product, and sum($|X_n|$) is the sum of the absolute values of each element of the matrix product.

23. The method as recited in claim 21 or 22 wherein SecondLargest(X) is replaced with the average of all the remaining values of the matrix product except Largest(X).

24. The method as recited in claim 23 further comprising the step of displaying the watermark pattern signal level with an icon.

25. The method as recited in claim 23 further comprising the step of displaying the watermark pattern signal level as a bar graph.

26. The method as recited in claim 23 further comprising the step of comparing SigLev with a constant near zero to determine a loss-of-signal condition to indicate that the signal either is not watermarked or the watermark pattern is insufficient for reliable decoding.

27. The method as recited in claim 1 wherein the watermark encoder generating step comprises the steps of:
counting frame clocks with a modulo N counter to produce addresses; and
outputting the pseudo-noise sequence from a lookup table in response to the addresses.

28. The method as recited in claim 1 wherein the generating step comprises the step of clocking a linear feedback shift register with a frame clock to produce the pseudo-noise sequence.

29. The method as recited in claim 1 wherein the watermark decoder generating step comprises the steps of:
calculating a matrix product of a circular shift pseudo-noise sequence matrix and the temporal synchronization signal, the temporal synchronization signal being a matrix having a value for each frame of the block of signal frames; and
determining as the offset signal an index to the entry in the matrix product having a maximum value.

30. The method as recited in claim 1 wherein the synchronizing step comprises the steps of:
counting a frame clock at the frame rate in a modulo N frame counter; and
loading the modulo N frame counter with the offset signal when the modulo N frame counter overflows so that the modulo N frame counter provides as an output a count corresponding to the block of signal frames in synchronization with the watermark encoder.

31. The method as recited in claim 1 further comprising the steps of:
obtaining a phase signal for the watermarked signal and a corresponding phase signal for the spatial synchronization pattern;
from the respective phase signals determining an x,y position shift from a nominal position.

32. The method as recited in claim 31 further comprising the step of applying the x,y position shift to the spatial synchronization pattern prior to the correlating step.

33. The method as recited in claim 31 wherein the obtaining step comprises the steps of:
performing a transform from the spatial to the frequency domain for the watermarked signal to produce as an output the phase signal; and
performing a transform from the spatial to the frequency domain for the spatial synchronization pattern to produce as an output the corresponding phase signal.

34. The method as recited in claim 33 wherein the second performing step comprises the step of reading the corresponding phase signal from a lookup table.

35. The method as recited in claim 31 wherein the determining step comprises the steps of:
- obtaining the difference between the respective phase signals to produce a phase differential signal; and
- performing a conversion from the frequency domain to the spatial domain for the phase differential signal to produce the x,y position shift.

36. The method as recited in claim 1 further comprising the steps of:
- adding to the watermark pattern in the watermark encoder an additional data pattern modulated by a truncated Walsh code as a Walsh pattern to add additional bits to the block of signal frames as a robust, low data rate channel where the data pattern represents a high data rate channel providing multiple bits per frame; and
- correlating in the watermark decoder the watermarked signal with the Walsh code to recover the additional bit minus one, with the final bit being determined by the polarity of the correlation result.

37. The method as recited in claim 36 comprising the step of obtaining a watermark pattern signal level from the Walsh pattern.

38. The method as recited in claim 37 wherein the obtaining step comprises the step of solving the following formula:

$$SigLev = 1 - |SecondLargest(s)/Largest(s)|$$

normalized to a range of zero to one where SigLev is the watermark pattern signal level, SecondLargest(s) is the second largest matrix product from a Walsh-Hadamard matrix representing the Walsh code, and Largest(s) is the largest matrix product from the Walsh-Hadamard matrix.

39. The method as recited in claim 1 wherein the data pattern comprises:
- a data portion; and
- an error correction code portion for providing error correction over the block of signal frames at the watermark decoder.

40. The method as recited in claim 39 wherein the error correction code comprises a Reed-Solomon code.

41. The method as recited in claim 1 wherein the block of signal frames is subdivided into sub-blocks having a duration of S frames comprising the steps of:
- encoding each sub-block at the watermark encoder with a repeating pseudo-noise sequence of length S, where S is an integer divisor of N;
- correlating each sub-block at the watermark decoder with the spatial synchronization pattern to determine whether frames are missing within the sub-block;
- for each sub-block where frames are missing, padding the sub-block with a repeat frame to maintain synchronization between the watermark decoder and watermark encoder on the sub-block level.

42. The method as recited in claim 1 wherein the block of signal frames is subdivided into sub-blocks having a duration of S frames comprising the steps of:
- encoding each sub-block at the watermark encoder with a repeating pseudo-noise sequence of length S, where S is an integer divisor of N;
- correlating each sub-block at the watermark decoder with the spatial synchronization pattern to determine whether frames are repeated within the sub-block;
- for each sub-block where frames are repeated, deleting the repeated frame from the sub-block to maintain synchronization between the watermark decoder and watermark encoder on the sub-block level.

43. The method as recited in claim 1 further comprising the step of forming a second watermark pattern for adding to the signal where the first spatial synchronization pattern is associated with a first set of data patterns and a second spatial synchronization pattern is associated with a second set of data patterns so that the watermark decoder checks for more than one spatial synchronization pattern at the same time.

44. The method as recited in claim 43 further comprising the step at the watermark decoder of:
- determining where there is more than one synchronization pattern in the watermarked signal a hierarchy between the synchronization patterns; and
- decoding the data pattern associated with the synchronization pattern having a higher priority.

45. A method of generating a watermark pattern for watermarking a signal comprising the steps of:
- multiplying quadrature components of a spatial synchronization pattern with a pseudo-noise sequence to produce quadrature spatio-temporal synchronization patterns;
- adding the quadrature spatio-temporal synchronization patterns to respective quadrature components of a data pattern to produce quadrature watermark patterns; and
- adding the quadrature watermark patterns to produce the watermark pattern.

46. The method as recited in claim 45 further comprising the step of modulating the quadrature watermark patterns with quadrature components of a carrier frequency to produce quadrature modulated watermark patterns; and
- adding the quadrature modulated watermark patterns to produce the watermark pattern.

* * * * *